Patented July 12, 1932

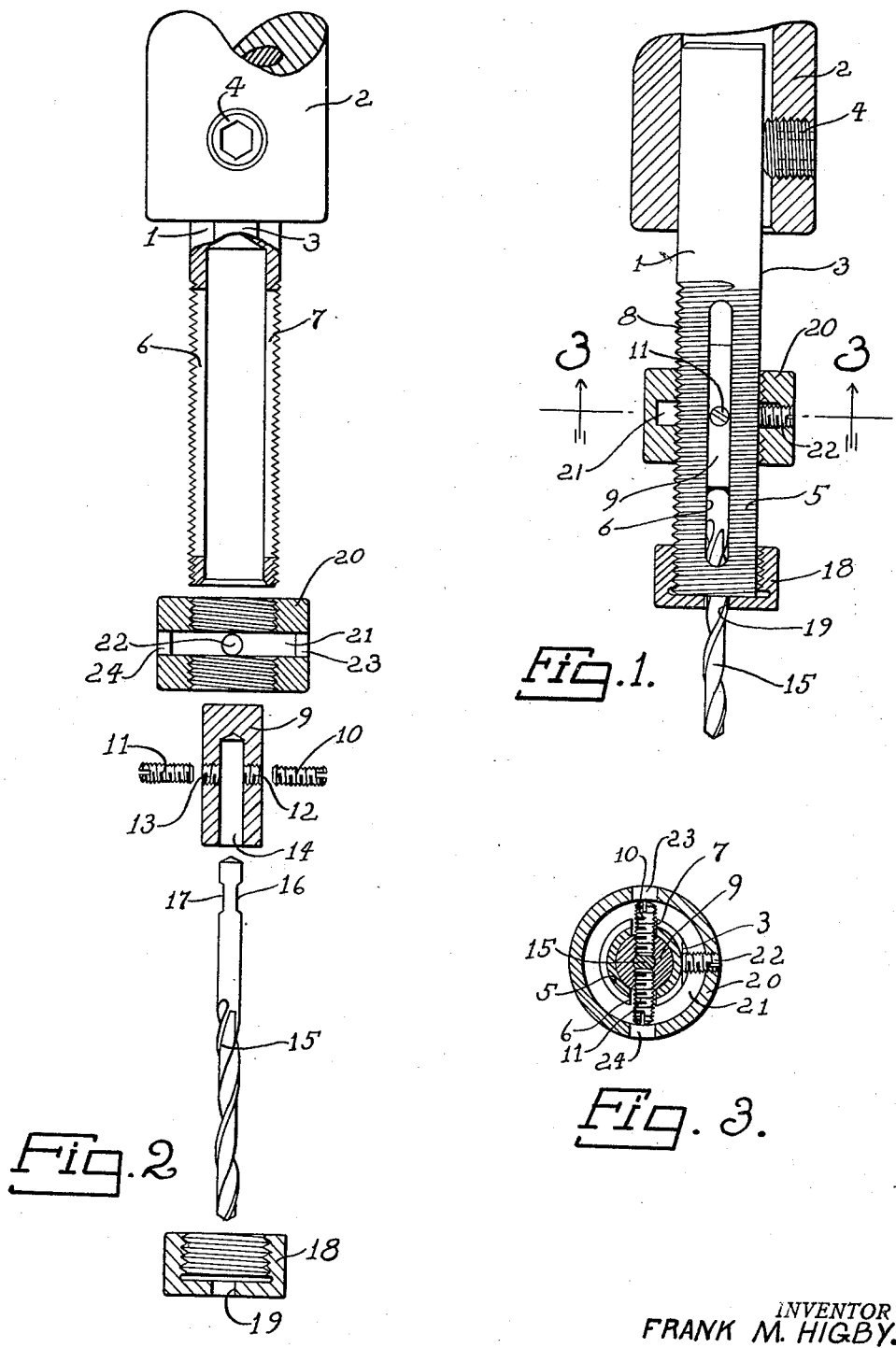

1,867,359

UNITED STATES PATENT OFFICE

FRANK M. HIGBY, OF BIRMINGHAM, MICHIGAN, ASSIGNOR TO CHRYSLER CORPORATION, OF DETROIT, MICHIGAN, A CORPORATION OF DELAWARE

DRILL CHUCK

Application filed April 2, 1930. Serial No. 441,089.

The main objects of this invention are to provide an improved drill chuck in which a substantially long drill may be supported at a location in close proximity to its cutting end so as to prevent wabbling of the drill during drilling operations, thereby obviating enlargement of the aperture being formed and breaking of the drill; to provide a device of this kind from which the drill may be extended from time to time so as to permit its cutting end to be reground while retaining the effective drilling depth substantially constant; to provide an improved support for the cutting end portion of a drill which rotates in unison with the drill and drill chuck allowing a close fitting engagement between the support and drill and preventing wear of the support; to provide a drill chuck of this kind in which substantially the entire boring portion of a drill may be used as the cutting end thereof is ground towards the shank of the drill; to provide variable means for predetermining the cutting depth of a drill; and to provide a support on a drill chuck for the cutting end portion of a drill which may be conveniently removed and replaced so as to adapt the chuck for receiving drills of various sizes.

An illustrative embodiment of my invention is shown in the accompanying drawing, in which:

Fig. 1 is an elevation, partly in section, of a drill chuck embodying my invention.

Fig. 2 is a detail sectional view showing the parts of my improved drill chuck arranged in the order in which they are assembled.

Fig. 3 is a horizontal section taken on line 3—3 of Fig. 1.

A collar 20 having an annular groove 21 in its inner periphery is threaded on the tubular portion 5 of the support and is provided with a set screw 22 which may be engaged against the flattened side 3 of the support so as to firmly secure the collar in an adjusted position. The outer ends of the set screws 10 and 11 extend into the annular groove 21 forming a connection between the shiftable member 9 and the collar 20 by means of which the member 9 may be raised and lowered by turning the collar 20 relative to the support so as to extend and retract the drill 15 relative to the tubular portion 5.

The device is assembled by placing the shiftable member 9 in the tubular portion 5 with the apertures 12 and 13 of the member 9 in registration with the slots 6 and 7 respectively of the tubular portion and inserting the screws 10 and 11 through oversize apertures 23 and 24 respectively into the collar 20 which communicate with the groove 21. The cap 18 is then screwed on the end of the tubular portion 5 and the drill 15 is inserted into the latter through the aperture 19 and into the passage 14 of the shiftable member 9 with the recesses 16 and 17 in registration with the screws 10 and 11 respectively. The screws 10 and 11 are then screwed inwardly until their inner ends abut the sides of the drill as shown in Fig. 3.

In operation, a substantially long drill may be safely employed for drilling apertures of short depths and as the drill wears it may be reground and extended from the interior of the tubular portion 5 by loosening the set screw 22 and turning the collar 20 in a counterclockwise direction as viewed in Fig. 3. The cap 18 serves as a guide to support the cutting end portions of the drill and also as a gage for predetermining the effective length of the drill. The drill may be reground and extended from time to time until the full length of its spiral boring portion has been used up.

In the form shown, the drill chuck comprises a substantially cylindrical support having a solid end portion 1 which extends into a socket 2 on a rotor of a drill press, not shown in the drawing. The support is provided with a flattened side portion 3 against which a set screw 4 in the socket 2 engages for firmly clamping the support in the socket 2.

Formed on the other end of the support is a tubular portion 5 which has longitudinally extending slots 6 and 7 located in diametrically opposite side portions. The tubular portion 5 has threads 8 on its outer periphery which extend from the lower end of the support substantially to the solid end portion 1 thereof.

An adaptor or socket 9 is shiftably mounted in the interior of the tubular portion 5 and is secured against rotation relative to the support by screws 10 and 11 which are mounted in diametrically opposite, radial apertures 12 and 13 respectively, formed in the shiftable member 9. The socket 9 has a central passage 14 for receiving the shank end of a drill 15 which has recesses 16 and 17 adjacent its outer end portion into which the screws 10 and 11 extend so as to firmly clamp the drill. Threaded on the outer end of the tubular portion 5 of the support is a cap 18 which has a central aperture 19 in its end wall through which the drill 15 extends.

The cap or support 18 rotates in unison with the drill chuck and drill and thus relative movement and wear between the sides of the aperture and the periphery of the drill is obviated. This construction permits a close fitting relation between the guiding support and the drill, thereby securing the drill against wabbling. This feature of the construction prevents enlargement of the hole being drilled and protects the drill against failure.

Although but one specific embodiment of this invention has herein been shown and described it will be understood that various changes including the size, shape and arrangement of parts may be made without departing from the spirit of my invention and it is my intention not to limit its scope other than by the terms of the appended claims.

I claim:

1. A drill chuck comprising a body part having a tubular end portion, a socket member shiftably mounted in said tubular end portion adapted to receive the shank of a drill, and means on the outer extremity of said tubular end portion having an inner peripheral wall closely embracing said drill for supporting the parts of the latter which are in close proximity to the cutting end thereof.

2. A drill chuck comprising a support, a member shiftably mounted on said support for receiving a drill, and a guide rigidly mounted on said support including a passage for receiving said drill having side walls closely embracing the latter for supporting the cutting end portion of said drill.

3. A drill chuck comprising a support, a member shiftably mounted on said support for receiving a drill, a guide rigidly mounted on said support including a passage for receiving said drill having side walls closely embracing the latter for supporting the cutting end portion of said drill and providing a stop for predetermining the effective drilling depth of said drill, and means for securing said shiftable member in a selected position for predetermining the spaced relation of the cutting extremity of said drill with respect to said guide.

4. A drill chuck comprising an externally threaded support having a tubular end portion, a member shiftably mounted in said tubular end portion having an opening for receiving the shank of a drill, a cap on the outer extremity of said tubular end portion including a passage for receiving the boring part of said drill having side walls closely embracing the latter, and a nut threaded on said support and connected with said shiftable member for extending and retracting said drill.

5. A drill chuck comprising a support having a split tubular end portion, a member shiftably mounted in said tubular end portion for receiving the shank of a drill, a collar threaded on said support having an annular groove in its inner periphery, a guide on the extremity of said tubular end portion having an aperture for receiving said drill, and means on said shiftable member for securing said drill thereto and extending through said split tubular member and into said groove for rotating said drill in unison with said support and said guide.

6. A drill chuck comprising a support, a threaded tubular end portion on said support having longitudinal slots therein, a member shiftably mounted in said tubular portion for receiving a drill, set screws extending through said slots and threaded in apertures in said shiftable member for clamping said drill and securing the latter against rotation relative to said support, and a member threaded on said tubular end portion and coacting with said set screws for controlling the movement of said shiftable member.

7. A drill chuck comprising a support, a threaded tubular end portion on said support having longitudinal slots therein, a member shiftably mounted in said tubular portion for receiving a drill, set screws extending through said slots and threaded in apertures in said shiftable member for clamping said drill and securing the latter against rotation relative to said support, a cap threaded on the outer end of said tubular member having an aperture for guiding said drill, and a collar threaded on said tubular end portion having an annular groove in its inner periphery for receiving the outer ends of said set screws so as to adjustably extend and retract said drill with respect to said tubular end portion.

8. A drill chuck comprising a support, a threaded tubular end portion on said support having longitudinal slots therein, a member shiftably mounted in said tubular portion for receiving a drill, set screws extending through said slots and threaded in apertures in said shiftable member for clamping said drill and securing the latter against rotation relative to said support, a cap threaded on the outer end of said tubular member having an aperture for guiding said drill, a collar threaded on said tubular end portion having an annular groove in its inner periphery for receiving the outer ends of said set screws so as to adjustably extend and retract said drill with respect to said tubular end portion, and means for rigidly securing said collar and adjustable member in an adjusted position.

9. A drill chuck comprising a tubular support, a member shiftably mounted in said support having an aperture for receiving a drill, means on said shiftable member for securing said drill to the latter, and an operating member on said support coacting with said drill securing means for extending and retracting said drill relative to said support.

FRANK M. HIGBY.